United States Patent [19]

Taylor et al.

[11] 4,191,320
[45] * Mar. 4, 1980

[54] DEGRADABLE ARTICLE

[75] Inventors: Lynn J. Taylor, Toledo; John W. Tobias, Perrysburg, both of Ohio

[73] Assignee: Owens-Illinois, Inc., Toledo, Ohio

[*] Notice: The portion of the term of this patent subsequent to Nov. 1, 1994, has been disclaimed.

[21] Appl. No.: 836,944

[22] Filed: Sep. 27, 1977

Related U.S. Application Data

[63] Continuation-in-part of Ser. No. 472,947, May 24, 1974, Pat. No. 4,056,665, which is a continuation-in-part of Ser. No. 301,199, Oct. 26, 1972, abandoned, which is a continuation-in-part of Ser. No. 206,144, Dec. 8, 1971, Pat. No. 3,797,690.

[51] Int. Cl.$^2$ .................................................. C08J 3/20
[52] U.S. Cl. ............................ 229/3.5 R; 215/1 C; 220/DIG. 30; 204/159.14; 260/DIG. 43; 526/914; 528/493
[58] Field of Search ............... 428/913; 220/DIG. 30; 206/524.6; 229/3.5 R; 215/1 C

[56] References Cited

U.S. PATENT DOCUMENTS

| | | | |
|---|---|---|---|
| 3,797,690 | 3/1974 | Taylor | 428/913 |
| 3,811,931 | 5/1974 | Guillet | 428/913 |
| 3,952,347 | 4/1976 | Comerford et al. | 428/913 |

Primary Examiner—Robert I. Smith
Attorney, Agent, or Firm—Charles S. Lynch; Myron E. Click

[57] ABSTRACT

There is disclosed a degradable article made from photodegradable polymeric or plastic compositions comprising at least one organic polymer or copolymer and at least two different aromatic carbonyl photosensitizers.

16 Claims, No Drawings

DEGRADABLE ARTICLE

RELATED APPLICATIONS

This application is a continuation-in-part of our copending U.S. Patent application Ser. No. 472,947, now U.S. Pat. No. 4,056,665, filed May 24, 1974; which is a continuation-in-part of previously copending and now abandoned U.S. Patent application Ser. No. 301,199, filed Oct. 26, 1972; which is a continuation-in-part of previously copending U.S. Patent application Ser. No. 206,144, filed Dec. 8, 1971, now U.S. Pat. No. 3,797,690.

BACKGROUND OF THE INVENTION

This invention relates to plastic articles of manufacture having enhanced environmental degradability.

The advent of plastics has given rise to improved methods of packaging goods. For example, polyethylene and polypropylene plastic films, bags, bottles, styrofoam cups and blister packages have the advantages of being chemically resistant, relatively unbreakable, light in weight and translucent or transparent. The increasing use of plastics in packaging applications has created a serious waste disposal problem. Burning of these plastic materials is unsatisfactory since it adds to air pollution problems.

Unlike some other packaging materials, such as paper and cardboard, plastics are not readily destroyed by the elements of nature. Thus, burying them is not an effective means of disposal, and can be expensive.

Plastics are biologically recent developments, and hence are not easily degradable by micro-organisms which attack most other forms of organic matter and return them to the biological life cycle. It has been estimated that it may take millions of years for organisms to evolve which are capable of performing this function. In the meantime, plastic containers and packaging films are beginning to litter the countryside after being discarded by careless individuals.

One approach to the alleviation of the problem of plastics waste and litter would involve the development of novel polymeric compositions which undergo accelerated degradation under environmental conditions.

In preparing photosensitive polymeric compositions for use in fabricating environmentally degradable plastic products, the usual approach is to incorporate a single photosensitizing additive. Within limits, the degradability of the composition can be regulated by varying the concentration of the sensitizing additive. This approach is satisfactory in a number of applications, e.g., where the product is a thin film of a polymer which undergoes relatively facile photodegradation.

In attempting to prepare photodegradable plastic articles of reasonable thickness, such as plastic bottles having a wall thickness of 0.01–0.05 inch, the aforementioned "prior art" method is not always effective; this is particularly true when the polymer is relatively resistant to photo-oxidative degradation. The relatively slow degradation rates observed in the case of thick-walled samples may be attributed to the following factors.

Firstly, though sunlight is a broad-spectrum source of ultraviolet and visible radiation, only those wavelengths of light corresponding to the ultraviolet absorption band of the photosensitizing additive are actually effective in promoting photodegradation; light of other wavelengths is not effective in promoting photodegradation, since it is not absorbed, and hence energy from light of these wavelengths is "wasted".

Secondly, there is a limit to the extent to which the rate of photodegradation can be increased by increasing the concentration of a single photosensitizing additive. If the concentration is too high, essentially all of the light of photochemically active wavelengths is absorbed near the exposed surface of the sample, and the remainder of the material is actually protected from photodegradation.

Such difficulties can be overcome, at least in part, by the use of degradable compositions containing two or more photosensitizing additives, particularly if the sensitizers absorb radiation in different regions of the ultraviolet spectrum. This approach makes it possible to maximize the energy absorbed from sunlight and hence, if the additives are photochemically active, to maximize the rate of photodegradation.

The use of multiple-sensitizer additive systems also offers an approach to the problem of excessive absorption of UV radiation near the surface of a thick-walled article, since lower concentrations of the individual sensitizers can be used, and since degradation will then involve light of two or more photochemically active wavelength ranges, each with its own characteristic relation between intensity and distance from the surface of the article. By the proper choice of sensitizing additives and adjustment of their concentrations, compositions of substantially improved degradability can be obtained. In some cases, it may be desirable to employ a high concentration of one additive, which absorbs strongly in a given wavelength range, in order to promote rapid photodegradation near the surface, while simultaneously employing a lower concentration of a second additive which absorbs in a different wavelength range, in order to promote more gradual degradation of the remainder of the material. The first sensitizer will then promote surface embrittlement and cracking, while the second will promote subsequent disintegration of the bulk of the material, e.g., by facilitating the propagation of cracks initiated at the surface.

DESCRIPTION OF THE INVENTION

In accordance with the practice of this invention, a photodegradable polymeric article is prepared by incorporating at least two different aromatic carbonyl photosensitizers into a thermoplastic organic polymeric material in amounts sufficient to accelerate the photodegradation of the resulting polymeric composition.

Any suitable thermoplastic polymeric material may be treated in accordance with this invention including polymers and copolymers. Typical organic polymers (and copolymers) contemplated especially include polyethylene, polypropylene, poly (1-butene), ethylene-propylene copolymers, ethylene-1 -butene copolymers, ethylene-1-hexene copolymers, ethylene-vinyl acetate copolymers, ethylene-ethyl acrylate copolymers, ethylene-acrylic acid copolymers and their salts, polyvinyl chloride poly(vinylidene fluoride), polyvinyl butyral, poly(caprolactam), poly(hexamethyleneadipamide), poly(ethylene terephthalate), styrene-butadiene copolymers, styrene-isoprene copolymers, and cellulose acetate butyrate.

The phrase "aromatic carbonyl photosensitizer", as used herein, may be defined as an organic compound possessing at least one aromatic (benzene) ring and at least one carbonyl group. Typical examples include aromatic ketones, aromatic diketones, aromatic aldehydes, and quinones possessing at least one aromatic ring.

The photosensitizers are added to the polymeric material in amounts sufficient to accelerate the photodegradation of the resulting composition.

Typical examples of aromatic carbonyl photosensitizers which may be utilized in the practice of this invention include aromatic ketones such as acetophenone, 1'-acetonaphthone, 2'-acetonaphthone, anisoin, anthrone, 9-acetylanthracene, benzophenone, benzoin, benzoin methyl ether, benzoin ethyl ether, benzoin isopropyl ether, benzoin isobutyl ether, benzoin phenyl acetate, benzalacetone, benzanthrone, benzoylacetone, 4,4'-bis(dimethylamino)-benzophenone, butyrophenone, chalcone, p-chloroacetophenone, alphachloroacetophenone, p-chlorobenzophenone, 2-chlorothioxanthone, desyl chloride, dibenzyl ketone, 2,2-diethoxyacetophenone, dibenzosuberone, dibenzalacetone, 4-dimethylaminobenzophenone, desoxyanisoin, desoxybenzoin, p-dimethylaminoacetophenone, 2,5-dimethylbenzophenone, di-o-tolylketone, flavanone, flavone, 9-fluorenone, 4'-methoxypropiophenone, propiophenone, alpha-tetralone, thioxanthone, undecanophenone, valerophenone, and xanthone; aromatic diketones such as benzil, benzoylacetone, 1,4-dibenzoylbutane, and 4,4''-oxydibenzophenone; aromatic aldehydes such as anthracene-9-carboxaldehyde, 4-benzyloxybenzaldehyde, diphenylacetaldehyde, 1-naphthaldehyde, 2-naphthaldehyde, and p-n-octyloxybenzaldehyde; and quinones such as anthraquinone, 1,2-benzanthraquinone, 2,3-benzanthraquinone, 2-tert-butylanthraquinone, 1-chloroanthraquinone, 2-chloroanthraquinone, 2-ethylanthraquinone, 1-methylanthraquinone, 2-methylanthraquinone, 2-methyl-1,4-naphthoquinone, and phenanthrenequinone.

In one highly preferred embodiment of this invention, a combination of two aromatic carbonyl sensitizers having different ultraviolet-absorption characteristics is employed. For example, one might select one photosensitizer having an ultraviolet absorption maximum between 280 and 330 millimicrons (referred to hereinafter as a "Type A photosensitizer") and a second photosensitizer having an ultraviolet absorption maximum between 330 and 400 millimicrons (referred to hereinafter as a "Type B photosensitizer"). The position of said ultraviolet absorption maxima can most readily be determined from an ultraviolet spectrum of the sensitizer in an organic solvent; preferably, the solvent should have a polarity comparable to that of the polymer in which the sensitizer is to be incorporated, e.g., a hydrocarbon solvent if the polymer is a polyolefin. Ultraviolet absorption maxima at wavelengths of less than about 280 millimicrons are not ordinarily associated with photosensitizing activity in the natural environment, since light of such short wavelengths is not present in natural sunlight.

Typical examples of "Type A" aromatic carbonyl photosensitizers include acetophenone, anthraquinone, benzalacetone, benzanthrone, butyrophenone, chalcone, p-chloroacetophenone, flavone, and alpha-tetralone. Typical examples of "Type B" aromatic carbonyl photosensitizers include anthracene-9-carboxaldehyde, benzophenone, benzil, 4,4'-bis(dimethylamino)-benzophenone, p-dimethylaminoacetophenone, 2,5-dimethylbenzophenone, and di-o-tolyl ketone.

The novel polymeric or plastic compositions of this invention can be prepared by a number of methods. A preferred method consists essentially of heating the polymer at a temperature below its decomposition temperature, incorporating the photosensitizers and mixing the ingredients so as to obtain a substantially uniform mixture. The mixture can then be molded and cooled to form a solid molded article. In the alternative, the mixture can be extruded and cooled to form a solid extrudate. Conventional plastic processing equipment can be used for melting the polymer, mixing the polymer with the additive(s) and molding or extruding the resulting mixture. Processing conditions, such as temperature, time, and pressure, will be obvious to those skilled in the art.

Another preferred process for preparing the novel polymeric compositions of this invention consists essentially of blending the photosensitizers with a solid thermoplastic polymer to obtain a substantially uniform mixture. The polymer is preferably in the form of pellets, granules or powder. Conventional plastic processing equipment can be used in the blending operation. The processing conditions will be obvious to those skilled in the art. The resulting mixture can be melted at a temperature below the decomposition temperature of the polymer and additives. The resulting melt can be extruded or molded and cooled to form a solid extrudate or molded article.

When either of the two aforementioned "preferred processes" is applied in the preparation of conventional degradable compositions containing a single additive, it is sometimes difficult to prepare a homogeneous composition as a result of limited solubility of the additive in the polymer and/or the high melting point of a solid additive. In such instances, the practice of the present invention offers an additional advantage, in that each additive can be employed at a lower concentration, and in that the incorporation of a second additive will lower the melting point of a high-melting solid additive.

The novel articles of manufacture of this invention can be prepared at the time of disposal of conventional plastic articles. For example, a plastic article can be crushed, milled or ground, and subsequently or simultaneously mixed with the photosensitizers.

A preferred process for preparing the novel polymeric compositions of this invention consists essentially of casting a film from a composition of the photosensitizers and a polymer in an inert solvent. By "inert solvent" is meant that the solvent does not react with the polymer or additives. Use of this method is particularly attractive for preparing degradable coating or adhesive materials.

The photosensitizers can also be applied as a solution, slurry, or paste to the surface of a plastic article. The coating composition can be applied by brushing, roller coating, spraying, dipping or printing (i.e., uniformly or image-wise) on the surface of the article, in the presence or absence of a solvent.

The novel degradable polymeric compositions can also contain non-reactive additives. By the term "non-reactive additive(s)" is meant a chemical additive, filler, or reinforcement commonly used in the formulation of plastic compositions which does not materially interfere with the degradation process. For example, the compositions of this invention can contain additives and processing aids, viscosity depressants, mold-release agents, emulsifiers, and slip agents. The composition of this invention can also contain anti-oxidants, anti-static agents, and fibrous reinforcements which do not materially detract from the eventual degradation of the composition. The compositions of this invention can also contain fillers, such as barium sulphate, calcium carbonate, calcium silicate, fumed colloidal silica, glass, and clay.

Flame retardants, lubricants, plasticizers, adhesion promoters and stabilizers, such as those used to prevent thermo-oxidative decomposition can also be used. In some cases, it may be necessary to add an antioxidant or stabilizer to permit high-temperature processing, even though such additive may slow the degradation process. In other cases, it may be desirable to retard degradation for a limited period of time.

It is contemplated that the degradable polymeric compositions of this invention will ordinarily contain about 90 to 99.9% by weight of the polymer and about 0.01 to 2.0% by weight of each aromatic carbonyl photosensitizers, such percentages being exclusive of any non-reactive additives.

The following example represents one of the best embodiments contemplated by the inventors.

EXAMPLE

A polyethylene film, thickness 0.11 millimeters, containing 0.05% by weight of benzophenone and 0.10% by weight of 2-ethylanthraquinone is prepared by casting from xylene solution onto a heated glass substrate. The resulting film is exposed, in air, to Pyrex-filtered ultraviolet radiation produced by a combination of two tubular sources, one emitting principally at 300 millimicrons and one emitting principally at 350 millimicrons. (RUL-3000 and RUL-3500 lamps, Southern New England Ultraviolet Company). The irradiated film is examined periodically by infrared spectrophotometry. After 24 hours' irradiation, the occurrence of significant photo-oxidative degradation is indicated by the appearance of an absorption peak at ca. 1720 cm$^{-1}$ (increase in absorbance 0.115 units). Longer irradiation leads to further increases in the intensity of the same band (cumulative increase of 0.155 absorbance units after 2 days, 0.205 units after 8 days, 0.365 units after 14 days).

The practice of this invention is particularly suitable for preparing degradable plastic articles of manufacture for packaging containers such as bottles and/or cans. Examples of such packaging articles are disclosed in the following U.S. Patent Nos.: 3,086,651; 2,874,835; 3,750,876, 3,752,305; 3,747,750; 3,016,182; 3,817,373; 3,084,792; and 3,476,237. All of the foregoing U.S. patents are incorporated by reference into this present patent application. In addition, applicants incorporate by reference copending U.S. Patent application Ser. No. 694,267, filed June 9, 1976, by James E. Heider, entitled "Merchandising Package For Containers," Owens-Illinois docket H-14212, assigned to the same assignee as the present patent application.

We claim:

1. As an article of manufacture, a photodegradable polymeric container package comprised of at least one thermoplastic organic polymer and at least two aromatic carbonyl photosensitizers present in amounts sufficient to accelerate the photodegradation of the resulting polymeric composition, at least one aromatic carbonyl photosensitizer having an ultraviolet absorption maximum in the range of 280 to 330 millimicrons and at least one other aromatic carbonyl photosensitizer having an ultraviolet absorption maximum in the range of 330 to 400 millimicrons.

2. The article of claim 1 wherein each of said aromatic carbonyl photosensitizers is present at a level of 0.01 to 2.0 percent by weight.

3. The article of claim 2 wherein the thermoplastic organic polymer is selected from the group consisting of polyethylene, polypropylene, poly(1-butene), and poly(vinyl chloride).

4. The article of claim 2 wherein each aromatic carbonyl photosensitizer is selected from the group consisting of aromatic ketones, aromatic diketones, aromatic aldehydes, and quinones possessing at least one aromatic ring.

5. The article of claim 4 wherein two aromatic carbonyl photosensitizers are employed, one being selected from the group consisting of acetophenone, anthraquinone, 2-tertbutylanthraquinone 1-chloroanthraquinone, 2-chloroanthraquinone, 2-ethylanthraquinone, 1-methylanthraquinone, 2-methylanthraquinone, benzalacetone, benzanthrone, butyrophenone, chalcone, p-chloroacetophenone, flavone, and alpha tetralone, and the other being selected from the group consisting of anthracene-9-carboxaldehyde, benzophenone, benzil, 4,4'-bis(dimethylamino)-benzophenone, p-dimethylaminoacetophenone, 2,5-dimethylbenzophenone, and di-o-tolyl ketone.

6. The article of claim 4 wherein two aromatic carbonyl photosensitizers are employed.

7. A process for preparing a degradable polymeric article of manufacture, which process comprises dispersing into a thermoplastic organic polymer at least two aromatic carbonyl photosensitizers in amounts sufficient to accelerate the photodegradation of the resulting polymeric composition, at least one aromatic carbonyl photosensitizer having an ultraviolet absorption maximum in the range of 280 to 330 millimicrons and at least one other aromatic carbonyl photosensitizer having an ultraviolet absorption maximum in the range of 330 to 400 millimicrons, and then shaping the polymer into an article of manufacture at an elevated temperature.

8. The process of claim 7 wherein the amount of each aromatic carbonyl photosensitizer dispersed in said thermoplastic organic polymer is in the range of 0.01 to 2.0 percent by weight.

9. The process of claim 8 wherein the thermoplastic organic polymer is selected from the group consisting of polyethylene, polypropylene, poly(1-butene), and poly(vinyl chloride).

10. The process of claim 8 wherein each aromatic carbonyl sensitizer is selected from the group consisting of aromatic ketones, aromatic diketones, aromatic aldehydes, and quinones possessing at least one aromatic ring.

11. The process of claim 10 wherein two aromatic carbonyl photosensitizers are employed, one being selected from the group consisting of acetophenone, anthraquinone, 2-tertbutylanthraquinone, 1-chloroanthraquinone, 2-chloroanthraquinone, 2-ethylanthraquinone, 1-methylanthraquinone, 2-methylanthraquinone, benzalacetone, benzanthrone, butyrophenone, chalcone, p-chloroacetophenone, flavone, and alpha tetralone, and the other being selected from the group consisting of anthracene-9-carboxaldehyde, benzophenone, benzil, 4,4'-bis(dimethylamine)-benzophenone, p-dimethylamineacetophenone, 2,5-dimethylbenzophenone, and di-o-tolyl ketone.

12. The process of claim 10 wherein two aromatic carbonyl photosensitizers are employed.

13. The process of claim 8 wherein the thermoplastic organic polymer is melted at a temperature below its decomposition temperature and the aromatic carbonyl photosensitizers are subsequently incorporated into the molten polymer.

14. The process of claim 8 wherein the polymer and the aromatic carbonyl photosensitizers are blended at ambient temperature and the resulting mixture is subsequently melted.

15. The process of claim 8 wherein the degradable composition is subsequently shaped by extrusion at elevated temperature.

16. The process of claim 8 wherein the degradable composition is subsequently shaped by molding at elevated temperature.

* * * * *